Nov. 1, 1966   S. L. WOOD ETAL   3,282,596
ELASTOMERIC DOUBLE FLANGE SEAL
Filed June 17, 1963   3 Sheets-Sheet 1

INVENTORS
Sherman Leo Wood &
George McClellan Staples III
BY Connolly and Hutz
ATTORNEYS

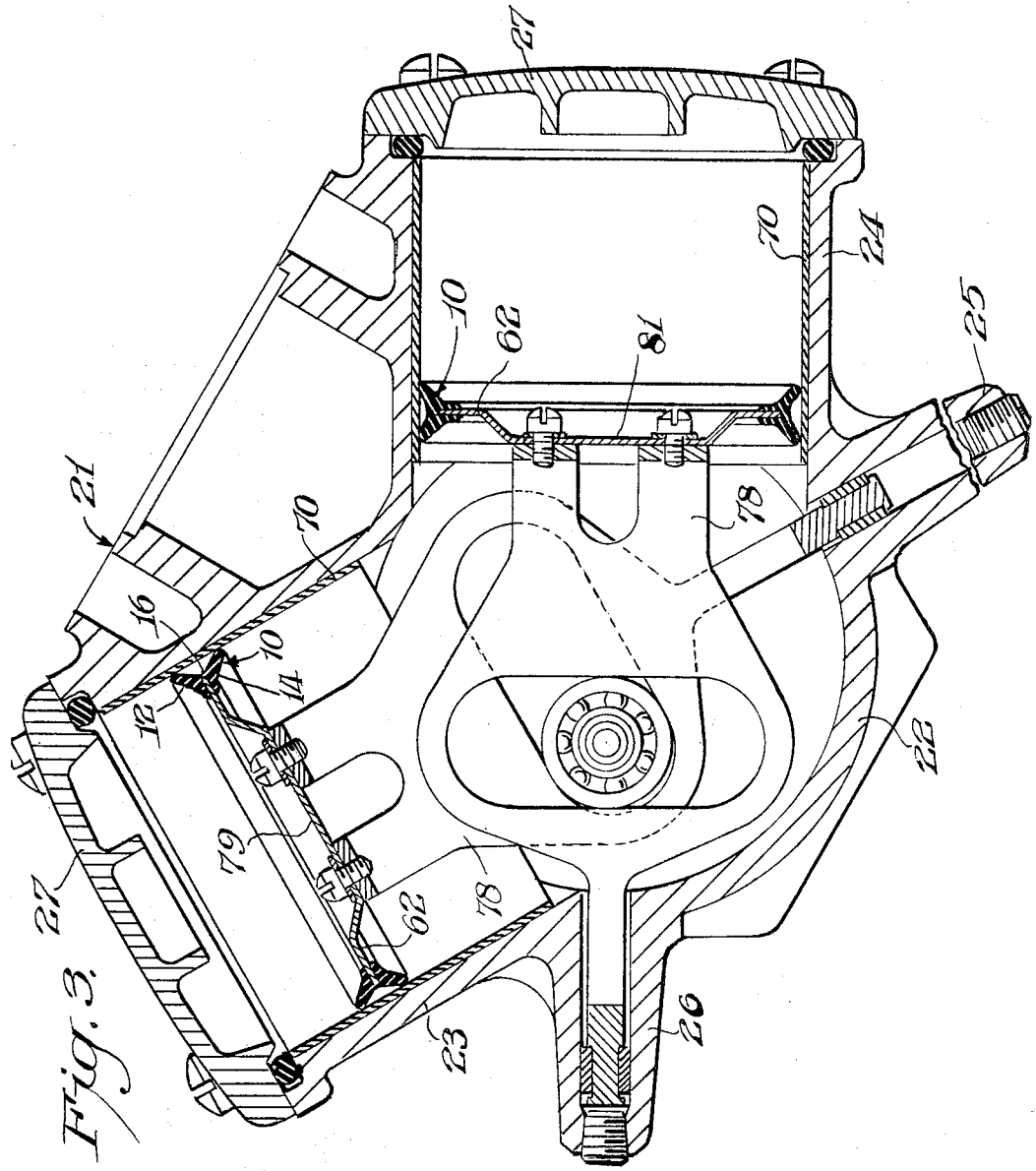

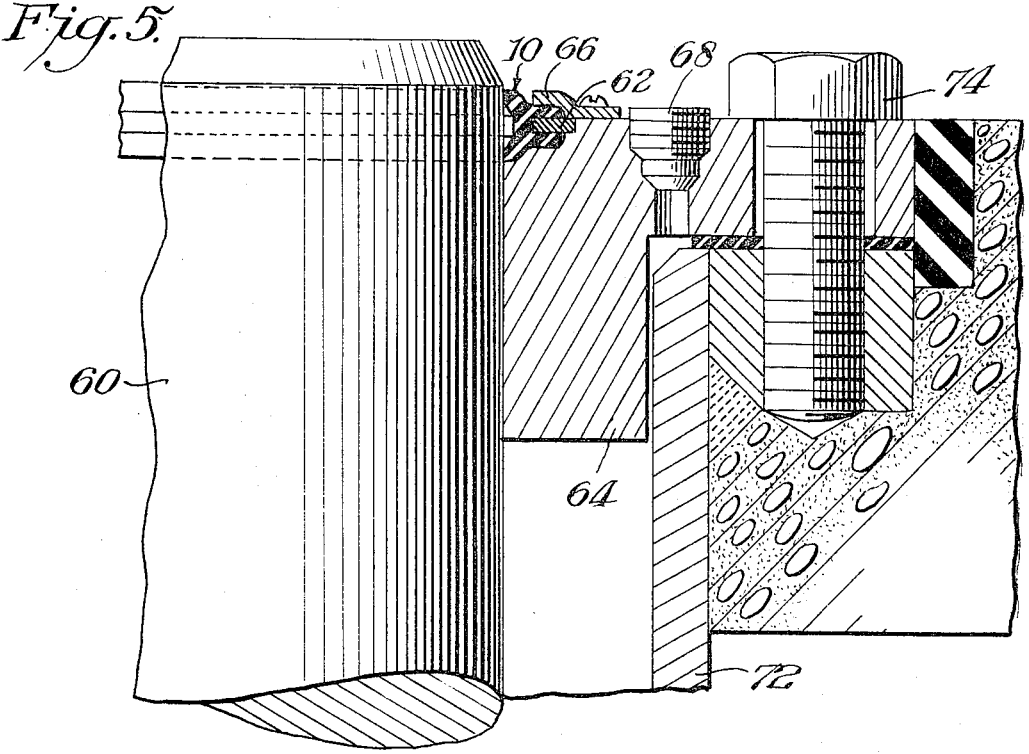
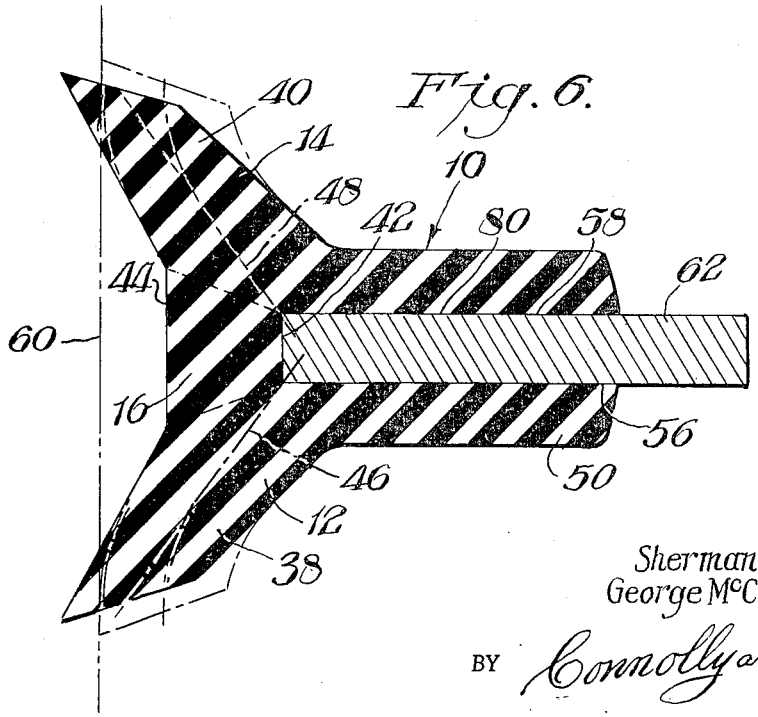
INVENTORS
Sherman Leo Wood &
George McClellan Staples III
BY Connolly and Hutz
ATTORNEYS United States Patent Office 3,282,596
Patented Nov. 1, 1966

3,282,596
ELASTOMERIC DOUBLE FLANGE SEAL
Sherman L. Wood and George M. Staples III, Salisbury, Md., assignors to Symington Wayne Corporation, Salisbury, Md., a corporation of Maryland
Filed June 17, 1963, Ser. No. 288,087
Claims priority, application Great Britain, June 19, 1962, 23,485/62
3 Claims. (Cl. 277—206)

This invention relates to a seal between relatively moving surfaces and more particularly to a seal between relatively sliding shaft and bearing surfaces.

Leather sealing rings have been utilized between the piston and cylinder walls of liquid meters and hydraulic hoists. Since leather is an animal product, its quality varies, it is of a porous nature and its dimensions are difficult to accurately control. Furthermore, leather sealing devices are expensive to make and difficult to assemble on a piston. Some known devices use a plastic composition or an elastomer such as a synthetic rubber as its material. This type of material has some properties that are better than leather for a seal because it has sufficient inherent resiliency to eliminate the need for the springs that are generally used in conjunction with leather seals. It is nonporous and it can be accurately molded. Existing elastomeric sealing devices, however, have proven unsuccessful primarily because the elastomeric material swells or shrinks when acted upon by different liquids. When the elastomeric material shrinks, the outer diameter of the flanges on the sealing device decreases and the seal is frequently broken, and when the elastomeric material swells, the outer diameter of the flanges interferes with the movement of the piston or shaft. Due to this drastic dimensional change in the elastomeric material, it has heretofore been considered impossible to make an elastomeric double flange seal which would effectively operate in spite of its tendency to swell or shrink.

Accordingly, an object of this invention is to provide an elastomeric seal between relatively moving surfaces which is simple in construction, economical and yet maintains substantially uniform dimensions even when subjected to liquids which make the elastomeric material swell or shrink.

In accordance with this invention the swelling or shrinking in one part of a seal is used to compensate for the swelling or shrinking in the active parts of the seal. The elastomeric sealing member is accordingly made in the form of a flanged ring having a pair of flanges extending on opposite sides of the plane of the ring and disposed at an obtuse angle to each other to form a shallow V. A junction section is disposed in the root of the V with an end remote from the ends of the flanges and a base portion is connected to the flanges for attaching the sealing ring to a supporting member. The junction section is integral with the flanges for transmitting the swelling or shrinking of the junction section to the flanges. The ring also includes means for anchoring the remote end of the junction section to cause the remaining portion of the junction section to move upon the swelling or shrinking in a direction substantially normal to the plane of the ring. The flanges are thus hinged to rotate about the anchoring means. The junction section is of a proper width and radial thickness relative to the flanges so that the flanges are rotated away from each other a sufficient extent when the elastomeric ring swells to substantially maintain the ends of the flanges at their original diameter. Likewise the flanges are rotated toward each other a sufficient extent when the elastomeric material shrinks to maintain the ends of the flanges at their original diameter.

The flanges may extend away from the center of the ring with the base portion disposed toward the center of the ring for mounting upon a shaft or piston with the flanges in contact with the surrounding bearing surface or cylinder wall. The flanges alternatively may extend toward the center of the ring for contacting an internal shaft and the base portion may be externally mounted on the bearing surface.

In an advantageous form of the invention the radial thickness of the junction section is substantially equal to the average thickness of one of the flanges and the junction section is disposed between the ends of the flanges and the intersection of the cross-sectional center lines of the flanges so that the junction section is integral with a substantial portion of the flanges. The flanges taper in cross section away from the junction section. The length of each flange may advantageously be substantially three times its average thickness while the maximum width of the junction section is substantially equal to the average thickness. The base portion may include a groove for receiving a support, and the junction section may have a minimum width equal to the width of the groove.

Novel features and advantages of the present invention will become apparent to one skilled in the art from a reading of the following description in conjunction with the accompanying drawings wherein similar reference characters refer to similar parts and in which:

FIG. 3 is a cross-sectional view of a meter incorporating the piston assembly shown in FIGS. 1–2;

FIG. 5 is a cross-sectional side view of an external seal assembly incorporating another embodiment of this invention and FIG. 6 is an enlarged view of the seal shown in FIG. 5.

In FIGS. 1–6 is shown a sealing device comprising a flanged ring 10 made of an elastomeric material such as a synthetic rubber which swells or shrinks when acted upon by a liquid. High nitrile buna-N synthetic rubber or nitrile butadiene is particularly suitable for use with petroleum fuels, solvents, water, water inorganic salt solutions, glycols, alcohols and some paint solvents. Other satisfactory materials include neoprene, chloroprene or CR synthetic rubber, butyl, isobutylene, isoprene or IIR synthetic rubber, polyurethane, diisocyanate synthetic rubber, and other synthetic rubbers or natural rubber.

Figure 1:
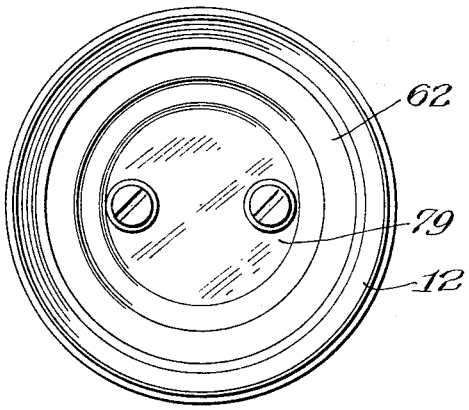
FIG. 1 is a top plan view of a piston assembly incorporating one embodiment of this invention.
Figure 2:
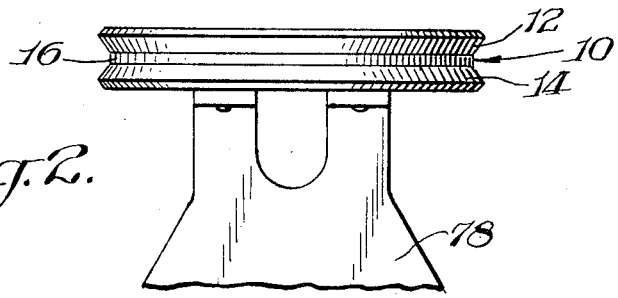
FIG. 2 is a side view in elevation of the piston assembly shown in FIG. 1.
Figure 4:
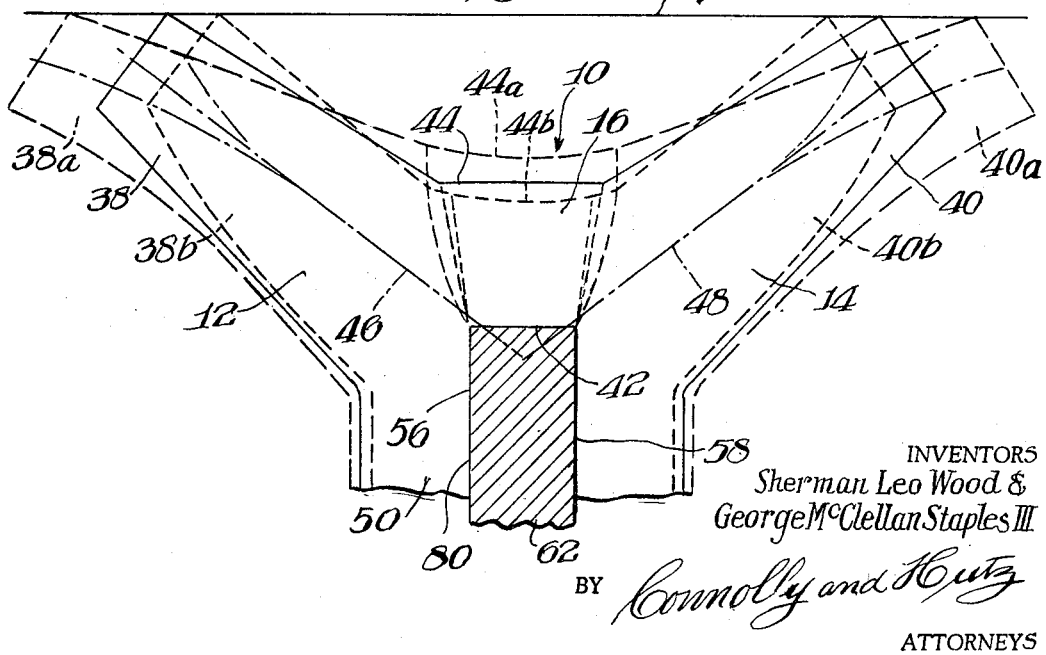
FIG. 4 is a diagrammatical cross-section view in elevation of the seal shown in FIGS. 1–3.

Ring 10 includes a pair of flanges 12 and 14 disposed at an obtuse angle to each other to form a shallow V as shown in FIGS. 4 and 6. Flanges 12 and 14 are tapered in cross section toward their tips or free ends 38 and 40 to provide greater flexibility at the tips in maintaining a sealing relationship with the surface they contact, such as meter cylinder 70 or hoist piston 60. Flanges 12 and 14 thus comprise a pair of sealing elements which provide pressure seals in either of two directions normal to supporting member 62 and which effectively maintain a sealing relationship during both stroke directions of the piston. Although flanged ring 10 is shown in a meter and in a hoist, its double flange construction may be used to maintain a sealing relationship between any type of relatively sliding shaft and bearing means.

A junction section 16 is disposed at the root of the V formed by flanges 12 and 14. Junction section 16 occupies a substantial portion of the root of the V to cause its swelling or shrinking to be transmitted to flanges 12 and 14 to cause them to rotate inwardly or outwardly. Although junction section 16 is integral with flanges 12 and 14, FIGS. 4 and 6 show imaginary lines of separation and imaginary cross-sectional center lines of the flanges to facilitate an understanding of the relationship between the junction section and the flanges. Junction section 16 is for example wedge-shaped and arranged in relation to flanges 12 and 14 to cause the following complementary action. When ring 10 swells or shrinks, which would tend to increase or decrease the diameter of the free ends 38 and 40 of the flanges, the swelling or shrinking in junction section 16 causes flanges 12 and 14 to rotate away from or toward each other to substantially maintain the ends 38 and 40 of flanges 12 and 14 at their original diameter. This compensatory action is provided by the following relationships. The radial thickness of junction section 16 with respect to the center of ring 10, that is the distance between edge 44 and edge 42, is substantially equal to the average thickness of the flanges. The maximum width of junction section 16 or the length of edge 44 is also substantially equal to the average thickness of the flanges while the length of each flange is substantially three times its average thickness. The cross-sectional center lines 46 and 48 of the flanges 12 and 14 intersect edge 42 and cross each other below junction section 16 so that the junction section is integral with a substantial portion of the flanges.

The end of junction section 16 which is remote from the ends 38 and 40 of flanges 12 and 14 is anchored as for example by edge 42 being bonded to rigid supporting member 62. Since the remainder of junction section 16 can still swell or shrink but edge 42 is held relatively stationary, the swelling or shrinking is transmitted to flanges 12 and 14 in a direction substantially normal to the plane of the ring. The flanges are thus hinged and rotate away from and toward each other when junction section 16 swells or shrinks.

Ring 10 is provided with a groove 80 in its base portion 50 for receiving a rigid supporting member 62. Edge 42 of junction section 16 comprises the base of groove 80. The minimum width of junction section 16, that is the length of edge 42, is thus substantially equal to the thickness of supporting member 62. Supporting member 62 is bonded to the sides 56 and 58 of groove 80 and to edge 42 of junction section 16. Each side 56 and 58 is substantially two flange thicknesses long to insure adequate bonding of ring 10 to support member 62 during the swelling or shrinking of ring 10. When such a double flange seal is used in a liquid meter, supporting member 62 comprises the outer portion of piston 79, 81. Supporting member 62 is made of a metallic material such as stainless steel or aluminum.

Since the extent of swelling or shrinking of junction section 16 is proportional to its width and junction section 16 is widest at its edge 44, the greatest swelling or shrinking occurs at this end of the junction section and the least swelling or shrinking occurs at opposite edge 42. This expansion or contraction is transmitted to flanges 12 and 14. Further, since edge 42 is anchored against swelling or shrinking, the swelling or shrinking in the remaining portion of the junction is transmitted to flanges 12 and 14 in a direction normal to the plane of ring 10.

When a solvent, for example such as benzene, acts upon elastomeric ring 10 to swell it, flanges 12 and 14 move radially and laterally outwardly as indicated by the suffix "a" in FIG. 4. Junction section 16, however, also swells laterally and radially outwardly. The swelling of junction section 16 is transmitted to flanges 12 and 14 to rotate the hinged flanges away from each other. The relative dimensions of flanges 12 and 14 and junction section 16 are such that the rotation of the flanges induced by junction section 16 is sufficient to maintain the free ends 38 and 40 at their original diameter so that the sealing relationship with cylinder 70 is maintained.

Similarly when a solvent, for example, shrinks elastomeric ring 10 to move flanges 12 and 14 laterally and radially inwardly, junction section 16 also shrinks and moves laterally and radially inwardly. The hinged flanges are rotated toward each other as indicated by the suffix "b" in FIG. 4 to substantially maintain the free ends 38 and 40 of the flanges at their original diameter.

The relative dimensions of the flanges and junction section are critical to the extent that the junction section must adequately compensate for the swelling or shrinking of the flanges without overcompensating. Further, the relative radial thickness of junction section 16 is critical to insure against the junction section overenlarging and seizing cylinder 70 or piston 60 upon maximum swelling.

The inclusion of the aforedescribed junction section in a double flanged sealing ring also compensates for changes in dimensions which might occur in the making of the device. For example when some plasticized synthetic rubber seals are leached out, the material shrinks which would tend to reduce the diameter of the ring. The aforedescribed junction section, however, causes the flanges to rotate toward each other to maintain the tips of the flanges at their designed diameter.

FIG. 3 shows a pair of double flanged rings used in a multiple piston meter of the type described in U.S. Letters Patent 2,741,131. The meter includes a main casing 21 having a crank case portion 22 and cylinder portions 23 and 24. Head plates 27 are detachably secured to cylinder portions 23 and 24 while guide barrels 25 and 26 are aligned with the cylinder portions. Piston rods 78 and 77 drive piston discs 79 and 81 having double flange rings 10 secured to outer portions 62 for sealingly contacting inner surfaces 70 of the cylinder portions.

The following description exemplifies the relative dimensions of the seal shown in FIG. 3. The inner surface 70 has an internal diameter of 3.00 inches and the diameter of ends 38 and 40 before contacting inner surface 70 or in their manufactured condition is in the range of between 3.030 and 3.055 inches. The maximum distance between the ends 38 and 40 is 0.392 inch while the minimum thickness of each end 38 and 40 is 0.052 inch. The outer diameter of junction section 16 is 2.875 inches while the inner diameter of the junction section is 2.750 inches. The outer diameter of each piston disc is thus also 2.75 inches. Each piston disc is offset in its center 0.231 inch to minimize parts and to allow interchangeability with prior discs. The exterior angle of each lip with respect to the plane of the ring is 130°. The flange bond or length of edges 56 and 58 is 0.140 inch to insure that the ring remains bonded to support member 62 while it swells or shrinks. With these dimensions the double flange ring is designed to have an interference fit equal to about one-half the thickness of a flange to compensate for wear and to insure against leakage when no pressure differential exists which occurs twice per revolution. Since the double flange ring 10 has an interference seal, wear and solvent effect compensation feature, it is suitable for use with gases as well as liquids.

FIG. 5 shows the double flange ring construction used in a hydraulic hoist. In this embodiment the double flanged ring 10 is secured to the stationary member and contacts movable piston 60 in sealing relationship. In FIG. 6 double flange ring 10 is shown in solid lines before it contacts piston 60 and in dashed lines when in contact with piston 60. As shown in FIG. 5, flanged ring 10 is mounted on supporting member 62 and it is secured to the periphery of annular bearing 64 by retaining member 66. Bearing 64 includes an air bleed plug 68 and is secured to cylinder casing 72 by screws 74. For a piston 60 having an external diameter of 10½ inches, the diameter of ends 38 and 40 before contacting piston 60, indicated by the solid lines in FIG. 6, is 10⅝₁₆ inches. The maximum distance between ends 38 and 40 is one inch. Inner edge 44 of junction section 16 has a diameter of 10²³⁄₃₂ inches while outer edge 42 has a diameter of 11⅝⁄₃₂ inches. The inner edge of supporting member 62 is also 11⅝⁄₃₂ inches in diameter and its outer edge is 13 inches in diameter. The thickness of supporting member 62 and the width of edge 42 is 0.134 inch. Base portion 50 has a thickness of ⅛ inch on each side of supporting member 62 and its outer diameter is 12½ inches.

As is readily apparent from the aforementioned description, the double flange seal construction may thus be attached to the stationary member as well as to the movable member of a relatively sliding seal.

What is claimed is:

1. A sealing member made of an elastomeric material which swells and shrinks when acted upon by a liquid for insertion between a relatively sliding shaft and bearing means comprising a flanged ring having a pair of flanges extending on opposite sides of the plane of said ring, the ends of said flanges having an original diameter before said elastomeric material swells and shrinks, said flanges being disposed at an obtuse angle to each other to form a shallow V, a junction section made entirely of said elastomeric material at the root of said V, a base portion connected to said flanges for attaching said ring to a supporting member, said junction section being integral with said flanges whereby the swelling and shrinking of said junction section is transmitted to said flanges, said junction section having an end portion remote from said ends of said flanges, means for rigidly anchoring said remote end portion of said junction section to cause the remaining portion of said junction section to move in an obstructed manner upon said swelling and shrinking in a direction normal to said plane of said ring to rotate said flanges respectively away from and toward each other when said elastomeric ring swells and shrinks, and said junction section comprising compensating means including the radial thickness of said junction section being equal to the average thickness of one of said flanges whereby said junction section causes said flanges to rotate away from each other a sufficient extent when said elastomeric ring swells to maintain said ends of said flanges at their original diameter and causes said flanges to rotate toward each other a sufficient extent when said elastomeric ring shrinks to maintain the ends of said flanges at their original diameter.

2. A sealing member as set forth in claim 1 wherein the length of each of said flanges is three times said average thickness, and said junction section has a maximum width equal to said average thickness.

3. A sealing member as set forth in claim 2 wherein said base portion includes a groove for the reception of said supporting member, said junction section has a minimum width equal to the width of said groove, said remote end portion of said junction section being the base of said groove, and the cross-sectional center lines of said flanges intersecting said base of said groove whereby said junction section is integral with a substantial portion of said flanges.

References Cited by the Examiner

UNITED STATES PATENTS 2,309,446   1/1943   Ekkebus _____ 277—178 X

FOREIGN PATENTS 879,513   10/1961   Great Britain.

LAVERNE D. GEIGER, *Primary Examiner.*

EDWARD V. BENHAM, *Examiner.*

J. MEDNICK, *Assistant Examiner.*

UNITED STATES PATENT OFFICE
CERTIFICATE OF CORRECTION

Patent No. 3,282,596                            November 1, 1966

Sherman L. Wood et al.

It is hereby certified that error appears in the above numbered patent requiring correction and that the said Letters Patent should read as corrected below.

Column 1, line 57, for "witth" read -- with --; column 2, line 38, for "this invention" read -- this invention; --; column 5, lines 25 and 26, for "obstructed" read -- unobstructed --.

Signed and sealed this 5th day of September 1967.

(SEAL)

Attest:

ERNEST W. SWIDER                            EDWARD J. BRENNER

Attesting Officer                                     Commissioner of Patents